Feb. 14, 1933.  R. E. APTHORP  1,897,658
DEVICE FOR INDICATING WIND VELOCITY
Filed June 4, 1930  3 Sheets-Sheet 1
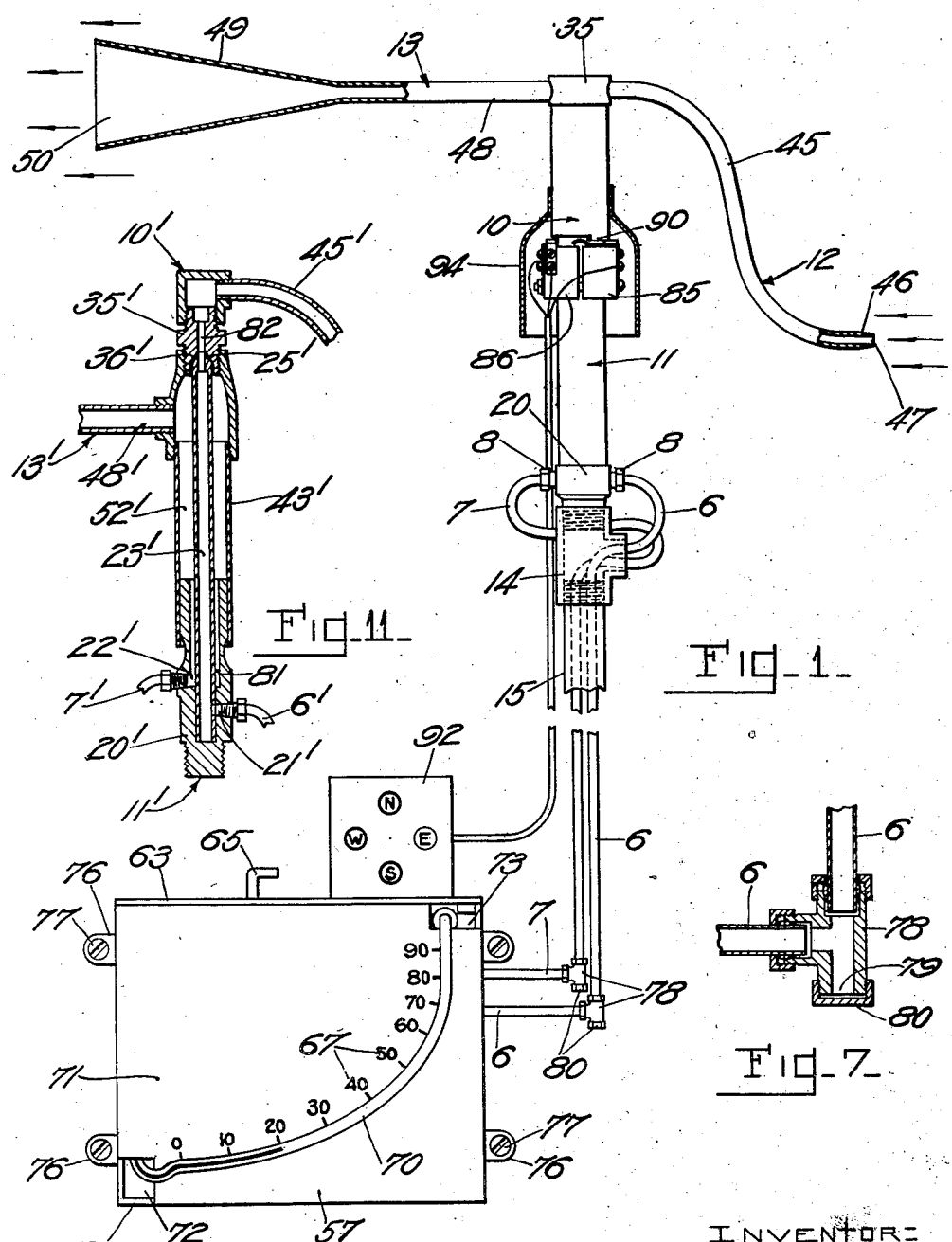
INVENTOR:
Robert E. Apthorp
by MacLeod, Calver, Copeland & Dike
Attys.

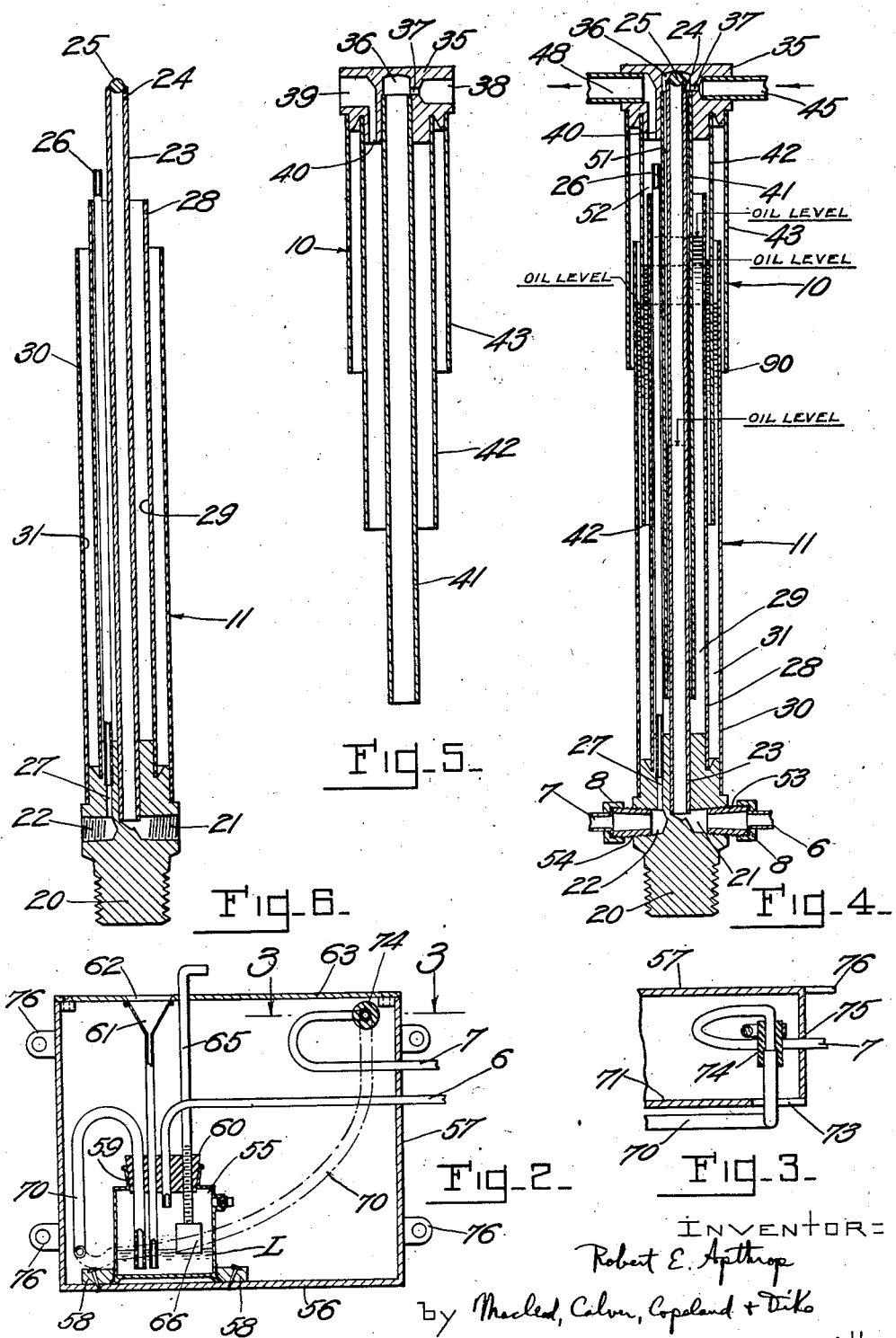

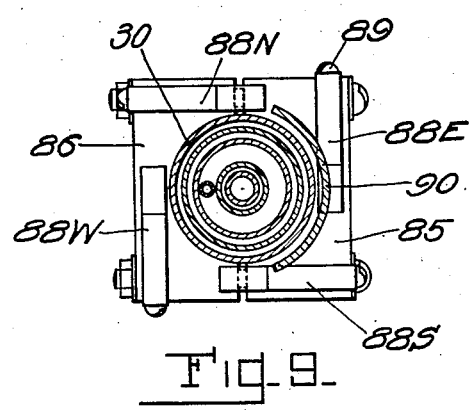
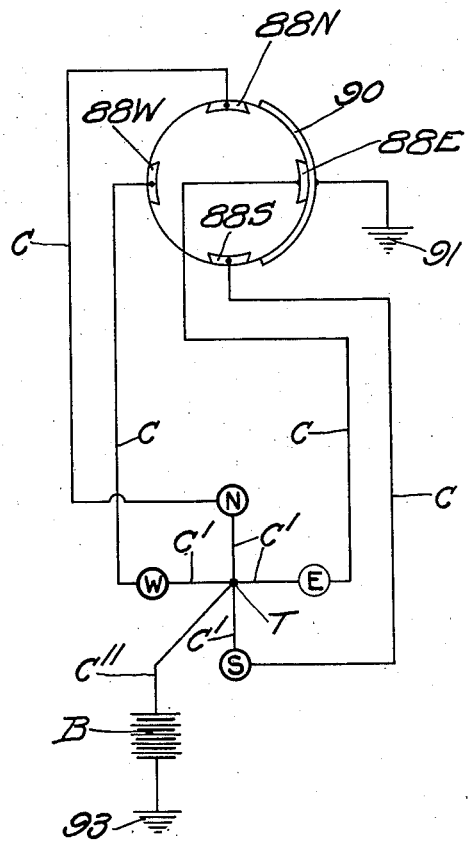
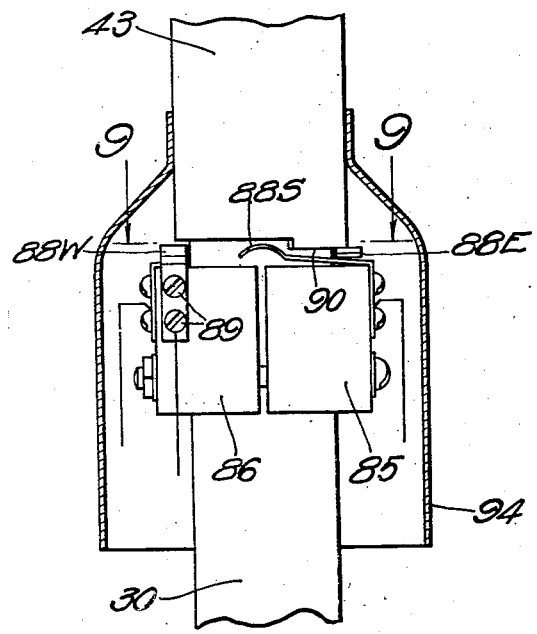

Patented Feb. 14, 1933

1,897,658

UNITED STATES PATENT OFFICE

ROBERT E. APTHORP, OF SALEM, MASSACHUSETTS

DEVICE FOR INDICATING WIND VELOCITY

Application filed June 4, 1930. Serial No. 459,191.

This invention relates to devices for indicating the velocity of wind and is particularly adapted for use in aviation fields where a direct reading instrument showing the velocity of the gusts is required.

Devices of this nature, as constructed heretofore, may be grouped in two general classes, namely, those which have been very costly and those which were unsatisfactory because they did not give a direct reading of actual velocity. Prior devices of this general character were greatly affected by weather conditions, such as rain, sleet and snow.

It is an object of the present invention to provide a device of this character which not only is relatively inexpensive but gives an accurate and reliable direct reading of the actual wind velocity and is not affected by adverse weather conditions.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawings: in which, Fig. 1 is an elevational view of one embodiment of the invention;

Fig. 2 is a sectional elevational view through the indicating device;

Fig. 3 is a sectional view taken on the line 3—3 of Fig. 2;

Fig. 4 is a partial sectional elevational view of the vane member assembled on its support;

Fig. 5 is a partial sectional view of the vane member;

Fig. 6 is a partial sectional view of the support;

Fig. 7 is a detail view of a portion of the apparatus;

Fig. 8 is a sectional detail view of a portion of the apparatus;

Fig. 9 is a sectional view taken upon the line 9—9 of Fig. 8;

Fig. 10 is a diagrammatic view of the electrical arrangement; and

Fig. 11 is a partial sectional view of a vane member of modified construction.

The invention contemplates the provision of a device for indicating the velocity of wind comprising a vane member suitably supported to be acted upon by the wind and having a movable vane provided with two openings, one to receive the pressure of the wind, and the other, preferably, at an angle of 180° thereto, to receive suction created by the wind. The suction opening is provided, preferably, in an enlargement which may have a conical portion tapering towards the wind.

One suitable construction embodying the invention comprises a movable vane member 10 rotatably carried by a support 11 and provided with a nose 12 and a tail 13. The vane member 10 is located so as to be acted upon by the wind, and, as illustrated, the support 11 may be connected by a T-coupling 14 to the upper end of a hollow rod 15 which, if desired, may project through the roof of a building.

The support 11, preferably, comprises a cylindrical block 20 of brass or other suitable material provided with holes 21 and 22. A hollow tube 23 is fitted in the block 20 so as to communicate with the opening 21 and is provided at its upper end with a suitable bearing member, such as a ball 25. An opening 24 is provided near the upper end of the tube 23. Spaced outwardly from the tube 23 is a hollow tube 26 which is suitably fitted in a hole 27 communicating with the hole 22 in the block 20. A tube 28 encloses the tubes 26 and 23 and is suitably fixed in the block 20 so as to provide an annular oil pocket 29 surrounding the tubes 23 and 26. A relatively large tube 30 is positioned concentric with the tubes 23 and 28 and is suitably secured to the block 20 to provide an oil pocket 31.

The movable vane member 10 comprises a cylindrical block 35 provided with an axial hole 36 communicating through a passage 37 with a radial hole 38. Positioned at an angle of 180° from the hole 38 is a radial hole 39 connecting at its inner end with a passage 40 parallel with the central hole 36. A central tube 41, slightly larger than the tube 23, is secured in the central hole 36. An intermediate tube 42, slightly larger than the tube 28, encloses the central tube 41 and the passage 40 and is suitably secured in the block 35. An annular closure 43, slightly larger than the tube 30, is suitably secured in the block 35.

When the vane member 10 is mounted upon the support 11 the bottom of the central hole 36 engages the ball 25 to permit the vane member 10 to rotate thereon relative to the support 11. The central tube 41 surrounds the tube 23 and depends into the oil in the pocket 29, while the intermediate tube 42 depends into the oil in the pocket 31 between the tubes 28 and 30. The closure 43 depends downwardly below the top edge of the tube 30 so as to prevent access of the elements thereto. In the form illustrated, the nose 12 of the vane member 10 is formed by a tube 45 which is suitably secured in the opening 38 and is curved downwardly and outwardly and is provided with a reduced portion 46 surrounding the opening 47 therein adapted to receive the pressure created by the wind. The downward inclination of the tube 45 prevents access of water to the interior of the device. The tail 13 of the vane is formed by a tube 48 which is suitably secured in the hole 39 and is provided at its free end with an enlargement 49, preferably of conical form, and having an opening 50 in its base adapted to receive suction created by the wind. Thus, it will be apparent that the pressure opening 47 in the nose of the vane communicates with the hole 21 in the support by a wind pressure passage comprising the tube 45, passage 37, and the opening 24 in the tube 23, which communicates with the chamber 51 between the tubes 41 and 23 above the oil level in the oil pocket 29. Likewise, the suction opening 50 in the tail of the vane communicates with the hole 22 in the support by a suction passage comprising the tube 48, passage 40 and the tube 26, the upper end of which terminates in the chamber 52 formed between the tubes 41 and 42 above the oil level in the oil pockets 29 and 31. It will be noted that the tube 41 depends into the oil in the pocket 29, thus forming an oil seal between the chambers 51 and 52 and consequently between the pressure passage and the suction passage. Likewise, it will be noted that the tube 42 depends into the oil in the pocket 31, thus forming an oil seal between the chamber 52 and the atmosphere.

Hollow plugs 53 and 54 are threaded in the holes 21 and 22 respectively and are connected at their outer ends to a pressure tube 6 and suction tube 7 respectively by couplings 8. The tubes 6 and 7 are connected, in the embodiment illustrated, to an indicator of the manometer tube type comprising a receptacle 55 secured in place upon the bottom 56 of a box 57, as by cleats 58. The receptacle 55 is provided with an opening 59 closed by a suitable closure, such as a rubber stopper 60. The receptacle 55 may be supplied with a suitable liquid L of low specific gravity and relatively high boiling point, such as kerosene, through a funnel 61 extending from a point just below an opening 62 in the cover 63 of the box 57 to a point below the level of the liquid in the receptacle 55. A rod 65 extends through the cover 63 of the box and is adjustably secured in closure 60. A block 66 on the lower end of the rod 65 depends into the liquid L in the receptacle 55 so that the liquid level therein may be adjusted.

A manometer tube 70 is located in an inclined position adjacent a scale 67 on the outside surface of the face 71 of the box 57 and one end is extended through an opening 72 into the interior of the box and then upwardly and downwardly through the closure 60 into the liquid L in the receptacle 55. The other end of the tube 70 extends through an opening 73 into the interior of the box and is fitted into a suitable coupling 74 which is clamped upon the end of the suction tube 7 which extends through an opening 75 in the side of the box 57. The box 57 is provided with suitable perforated ears 76, so that it may be secured as by screws 77 in any desired location. Preferably, each of the tubes 6 and 7 is connected at an intermediate point to T-fitting 78 providing an opening 79 normally closed by a cap 80 which is removed when correcting the indicator when necessary due to the evaporation of the liquid L.

It is sometimes desirable to determine the direction of the wind as well as its velocity. For this purpose, as illustrated in Figs. 1, 4, 8, 9 and 10, blocks 85 and 86 of insulating material, and preferably weather proof, are clamped upon the surface of tube 30 of the support 11 adjacent the lower edge of the sleeve 43 of the movable vane member 10. Spring contacts 88N, 88W, 88S and 88E are secured upon the blocks 85 and 86, as by screws 89, in the north, west, south and east positions respectively and each is adapted for engagement with a contact 90 on the vane member 10 below the nose thereof which is grounded through the vane support 11 as indicated diagrammatically at 91 in Fig. 10. The contact 90 is of such length, preferably about 135°, that it will bridge any two adjacent contacts 88N, 88W, 88S and 88E if the direction of the wind is northeast, northwest, southeast or southwest. The contacts 88N, 88W, 88S and 88E are electrically connected by separate conductors C with lamps N, W, S and E respectively on a panel 92 positioned in any convenient location near the scale 67. Each of the lamps N, W, S and E are connected by conductors C' to a common terminal T which is connected by conductor C'' to a source of energy, such as a battery B, which is grounded as at 93. The contacts 88N, 88W, 88S, 88E and 90 are enclosed by an annular closure 94 extending outwardly and downwardly from the sleeve 43 in order to protect the same from the elements.

In the operation of the device, the action of the wind upon the tail of the vane turns the movable vane member 10 so that the pressure opening 47 receives the pressure of the wind. This pressure, which is directly proportional to the square of the wind velocity, is transmitted to the hole 21 and thence through the tube 6 to the chamber in the receptacle 55 upon the liquid level, thus forcing the liquid L into the tube 70 and causing it to rise therein. The velocity of the wind creates suction in the suction opening 50 which is transmitted to the hole 22 and thence through the tube 7 to the upper end of the manometer tube 70, thus assisting the rise of the liquid in the manometer tube. When the device is used at high altitudes a correction factor should be applied to the readings to correct the error due to the lower density of the air. The rise of the liquid in the manometer tube is increased about 25 per cent due to the action of suction. It has been found in actual wind tunnel tests of the device that in velocities up to 80 miles per hour (the capacity of the tunnel) when the opening 50 is provided in an enlargement of conical shape that the added rise of the liquid L in the manometer tube due to the action of the suction created by the wind is uniformly proportional to the square of the wind velocity.

It will be understood that the depth of the pockets 29 and 31 and the length of the tubes 41 and 42 which depend therein must be such as to insure that there always will be a proper liquid seal between the chambers 51 and 52 and the atmosphere regardless of the wind velocity encountered.

It will be understood that as the direction of the wind shifts, the contact 90 on the vane member 10 will move over the contacts 88N, 88W, 88S and 88E and will close separately the various circuits through the lamps N, W, S and E. If, however, the direction of the wind is not exactly north, west, south or east the contact 90 will bridge two adjacent contacts. Thus, for example, if the wind is northeast the contact 90 will bridge the contacts 88N and 88E and close the circuits through both the lamps N and E to indicate that the direction of the wind is between north and east.

The device is sensitive and accurate because the movable vane member 10 frictionally engages only the ball 25 and the oil in the pockets 29 and 31 and the pressure and suction passages which actuate the indicator are perfectly sealed by liquid from each other and the atmosphere. The action of suction created by the wind is particularly helpful in providing an accurate indication at low wind velocities. The device eliminates inaccuracies caused by sleet and snow inasmuch as the suction opening is not directly exposed as in some prior devices.

The arrangement of the pressure opening is such that it would be extremely difficult for sleet and snow to clog the pressure opening completely as would be necessary to render it ineffective.

In Fig. 11 a modified form of vane member is illustrated which does not embody a liquid seal between the pressure and suction passages and the atmosphere. In this construction, the support 11' comprises a cylindrical block 20' having holes 21' and 22' connected with pressure and suction tubes 6' and 7' respectively. The block 20' is elongated and provided with an axial hole 81 surrounding a tube 23' and communicating with the hole 22'. The upper end of the tube 23' is provided with a tapered bearing surface 25' adapted to receive a similarly shaped surface 36'. A central hole 82 in the block 35' of the movable vane member 10' communicates at one end with the passage in the tube 23' and at its other end with the pressure tube 45'. A closure 43', such as a sleeve, depends from the block 35' and fits relatively close over the side wall of the block 20' to provide, in effect, an air seal therebetween. A tube 48' forming the tail 13' of the vane communicates with the suction chamber 52' formed within the closure 43' above the block 20'. The tapered bearing surface 25' cooperating with the similar surface on the block 35' seals the pressure passage from the suction chamber 52'.

I claim:

1. In a device for indicating wind velocity, the combination of a support, a vane movably carried by said support and having a nose and a tail, said vane having a pressure passage terminating in an opening facing in the same direction as the nose of the vane, said vane having an enlargement of conical form tapering towards the wind, said vane having a suction passage terminating in an opening in the base of said cone, said support having suction and pressure passages, said support and vane cooperating to connect the suction and pressure passages of the former with the suction and pressure passages of the latter respectively, and means connected with the suction and pressure passages in said support for indicating the velocity of the wind.

2. In a device for indicating wind velocity, a support having a pair of pockets one surrounding the other and each containing a liquid, a pressure tube in said support centrally located in the inner pocket and extending above the liquid therein, a suction tube in said support, positioned outwardly from said pressure tube and extending above the highest level of liquid in said pockets, a vane movably carried by said support and having spaced sleeves, one depending into the liquid in said inner pocket and between said pressure and suction tubes, and another sleeve depending into the liquid in said outer pocket and outside said suction tube thereby providing a pressure chamber surrounding said pressure tube and a suction chamber surrounding said suction tube sealed by liquid from each other and the atmosphere, said vane having a passage extending from said pressure chamber to receive the pressure of the wind and a passage extending from said suction chamber to receive suction created by the wind, and a closure for said outer pocket depending from said vane.

3. In a device for indicating wind velocity, the combination of a receptacle containing a liquid, a closure for the receptacle, an inclined tube having its lower end below the level of the liquid in said receptacle, an extension on the lower end of said tube rising above said receptacle and extending through said closure and into said liquid, and a pressure tube extending through said closure and terminating above the level of the liquid.

In testimony whereof I affix my signature.

ROBERT E. APTHORP.